US012586729B2

(12) United States Patent
An et al.

(10) Patent No.: US 12,586,729 B2
(45) Date of Patent: Mar. 24, 2026

(54) MULTILAYER ELECTRONIC COMPONENT

(71) Applicant: SAMSUNG ELECTRO-MECHANICS CO., LTD., Suwon-si (KR)

(72) Inventors: So Jung An, Suwon-si (KR); Hyung Jong Choi, Suwon-si (KR); Jung Won Park, Suwon-si (KR); Yoo Jeong Lee, Suwon-si (KR); Kwang Yeun Won, Suwon-si (KR); Woo Kyung Sung, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 80 days.

(21) Appl. No.: 18/583,094

(22) Filed: Feb. 21, 2024

(65) Prior Publication Data

US 2024/0312718 A1     Sep. 19, 2024

(30) Foreign Application Priority Data

Mar. 14, 2023     (KR) ......................... 10-2023-0033556

(51) Int. Cl.
*H01G 4/30*          (2006.01)
*H01G 4/008*        (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 4/008; H01G 4/012; H01G 4/12; H01G 4/2325
See application file for complete search history.

(56) References Cited

U.S. PATENT DOCUMENTS 10,886,066 B2     1/2021   Lee et al.
10,892,101 B2 *   1/2021   Lee ........................ H01G 4/232
(Continued)

FOREIGN PATENT DOCUMENTS

JP          2021-068851 A      4/2021
JP          2021-100019 A      7/2021
KR     10-2020-0002124 A      1/2020

OTHER PUBLICATIONS

Extended European Search Report issued in corresponding European Application No. 24158361.6 dated May 20, 2025.

*Primary Examiner* — Michael P Mcfadden
(74) *Attorney, Agent, or Firm* — MORGAN, LEWIS & BOCKIUS LLP

(57)          ABSTRACT

A multilayer electronic component includes a body including a dielectric layer and an internal electrode alternately disposed with the dielectric layer; and an external electrode disposed on the body, wherein the external electrode includes an electrode layer connected to the internal electrode and including Cu, a first plating portion disposed on the electrode layer, and a second plating portion disposed on the first plating portion, and wherein the first plating portion includes a Ni layer in contact with the electrode layer, and an intermetallic compound layer disposed on the Ni layer and including an intermetallic compound including at least one of Ni and Sn.

14 Claims, 6 Drawing Sheets

(51) Int. Cl.
    *H01G 4/012*        (2006.01)
    *H01G 4/12*         (2006.01)
    *H01G 4/232*       (2006.01)

(56) References Cited

U.S. PATENT DOCUMENTS

| | | | |
|---|---|---|---|
| 2012/0288724 | A1* | 11/2012 | Ogawa .................... C23C 26/00 |
| | | | 428/457 |
| 2013/0258546 | A1 | 10/2013 | Kim et al. |
| 2014/0321025 | A1* | 10/2014 | Saito ...................... H01G 4/232 |
| | | | 205/181 |
| 2017/0330689 | A1 | 11/2017 | Hatanaka et al. |
| 2019/0252123 | A1* | 8/2019 | Kim .......................... H01G 4/12 |
| 2020/0006001 | A1* | 1/2020 | Lee ......................... H01G 4/248 |
| 2020/0082984 | A1* | 3/2020 | Kim ...................... H01G 4/248 |
| 2020/0411248 | A1 | 12/2020 | Hashimoto |
| 2021/0125780 | A1* | 4/2021 | Hayashi ................. H01G 4/248 |
| 2021/0193386 | A1 | 6/2021 | Dozen et al. |
| 2022/0148814 | A1 | 5/2022 | Itogawa |

\* cited by examiner

100

FIRST
DIRECTION

SECOND
DIRECTION

I-I'

FIRST
DIRECTION

THIRD
DIRECTION

II-II'

FIRST
DIRECTION
SECOND
DIRECTION
THIRD
DIRECTION

FIRST
DIRECTION

SECOND
DIRECTION

'P'

MULTILAYER ELECTRONIC COMPONENT

CROSS-REFERENCE TO RELATED APPLICATION(S)

This application claims the benefit of priority to Korean Patent Application No. 10-2023-0033556 filed on Mar. 14, 2023 in the Korean Intellectual Properties Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of various electronic products such as a liquid crystal display (LCD) and a plasma display panel (PDP), a computer, a smartphone, and charging or discharging electricity.

As electronic products have been designed to have a reduced size, thickness and functionality, chip components have also been required to have a reduced size, and mounting of electronic components has also become highly integrated. In response to this trend, as a measure to ensure sealability and mountability of a mounted multilayer electronic component, a Ni plating layer and a Sn plating layer may be formed in order on a Cu electrode layer. In the case of a multilayer electronic component requiring high reliability, forming a plating layer without defects such as plating layer breakage or void formation in the plating layer may have a significant impact on improving moisture resistance reliability of the multilayer electronic component.

SUMMARY

An example embodiment of the present disclosure is to address deterioration of moisture resistance reliability of a multilayer electronic component due to hydrogen formed when a plating layer is formed on an external electrode.

According to an example embodiment of the present disclosure, a multilayer electronic component includes a body including a dielectric layer and an internal electrode alternately disposed with the dielectric layer; and an external electrode disposed on the body, wherein the external electrode includes an electrode layer connected to the internal electrode and including Cu, a first plating portion disposed on the electrode layer, and a second plating portion disposed on the first plating portion, and wherein the first plating portion includes a Ni layer in contact with the electrode layer and including Ni, and an intermetallic compound layer disposed on the Ni layer and including an intermetallic compound including at least one of Ni and Sn According to an example embodiment of the present disclosure, a multilayer electronic component includes a body including a dielectric layer and an internal electrode alternately disposed with the dielectric layer; and an external electrode disposed on the body, wherein the external electrode includes an electrode layer connected to the internal electrode and including Cu, a first plating portion disposed on the electrode layer, and a second plating portion disposed on the first plating portion, and wherein the first plating portion includes a Ni layer in contact with the electrode layer and including Ni, an intermetallic compound layer disposed on the Ni layer and including an intermetallic compound including at least one of Ni and Sn, and a Sn layer disposed on the intermetallic compound layer and including Sn.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
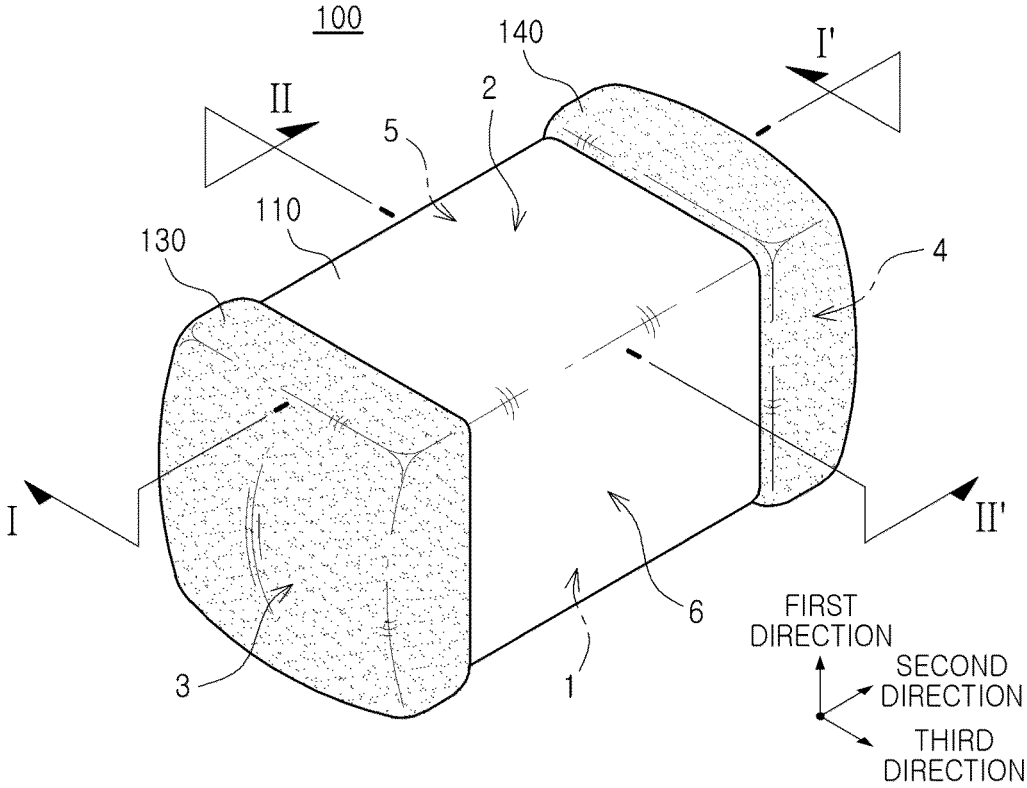
FIG. 1 is a perspective diagram illustrating a multilayer electronic component according to an example embodiment of the present disclosure.

Hereinafter, embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements may not necessarily reflect the actual sizes of these elements. The terms, "include," "comprise," "is configured to," or the like of the description are used to indicate the presence of features, numbers, steps, operations, elements, portions or combination thereof, and may not exclude the possibilities of combination or addition of one or more features, numbers, steps, operations, elements, portions or combination thereof.

In the drawings, a first direction may be defined as a direction in which first and second internal electrodes are alternately disposed with a dielectric layer interposed therebetween or a thickness T direction, among second and third directions perpendicular to the first direction, a second direction may be defined as a length L direction, and a third direction may be defined as a width W direction.

FIG. 1 is a perspective diagram illustrating a multilayer electronic component according to an example embodiment.

Figure 2:
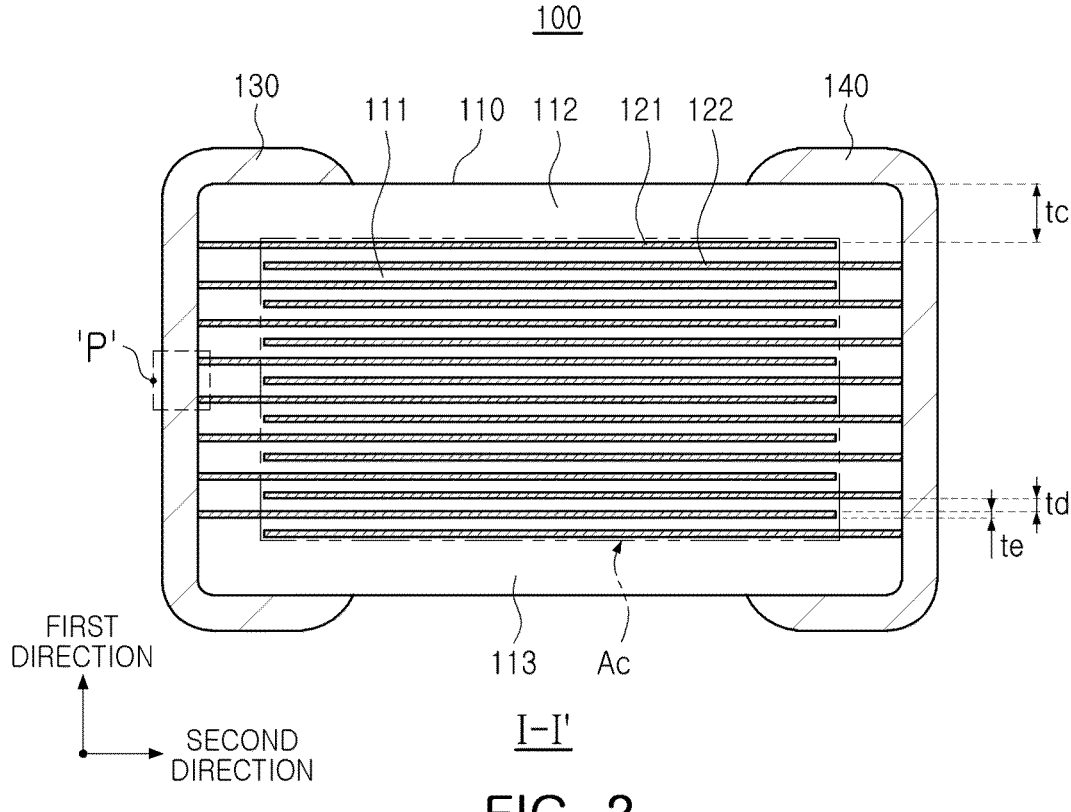
FIG. 2 is a cross-sectional diagram taken along line I-I' in FIG. 1.

FIG. 2 is a cross-sectional diagram taken along line I-I' in FIG. 1.

Figure 3:
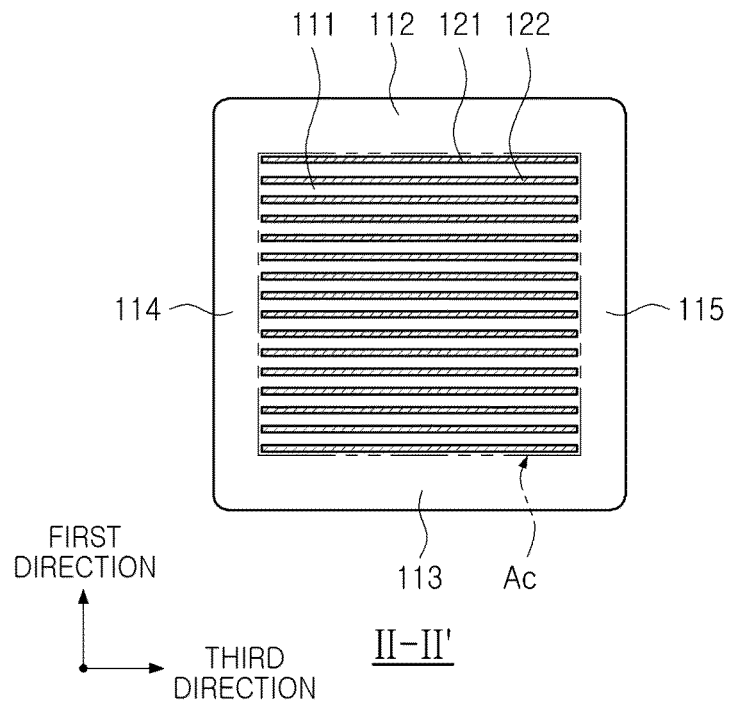
FIG. 3 is a cross-sectional diagram taken along line II-II' in FIG. 1.

FIG. 3 is a cross-sectional diagram taken along line II-II' in FIG. 1.

Figure 4:
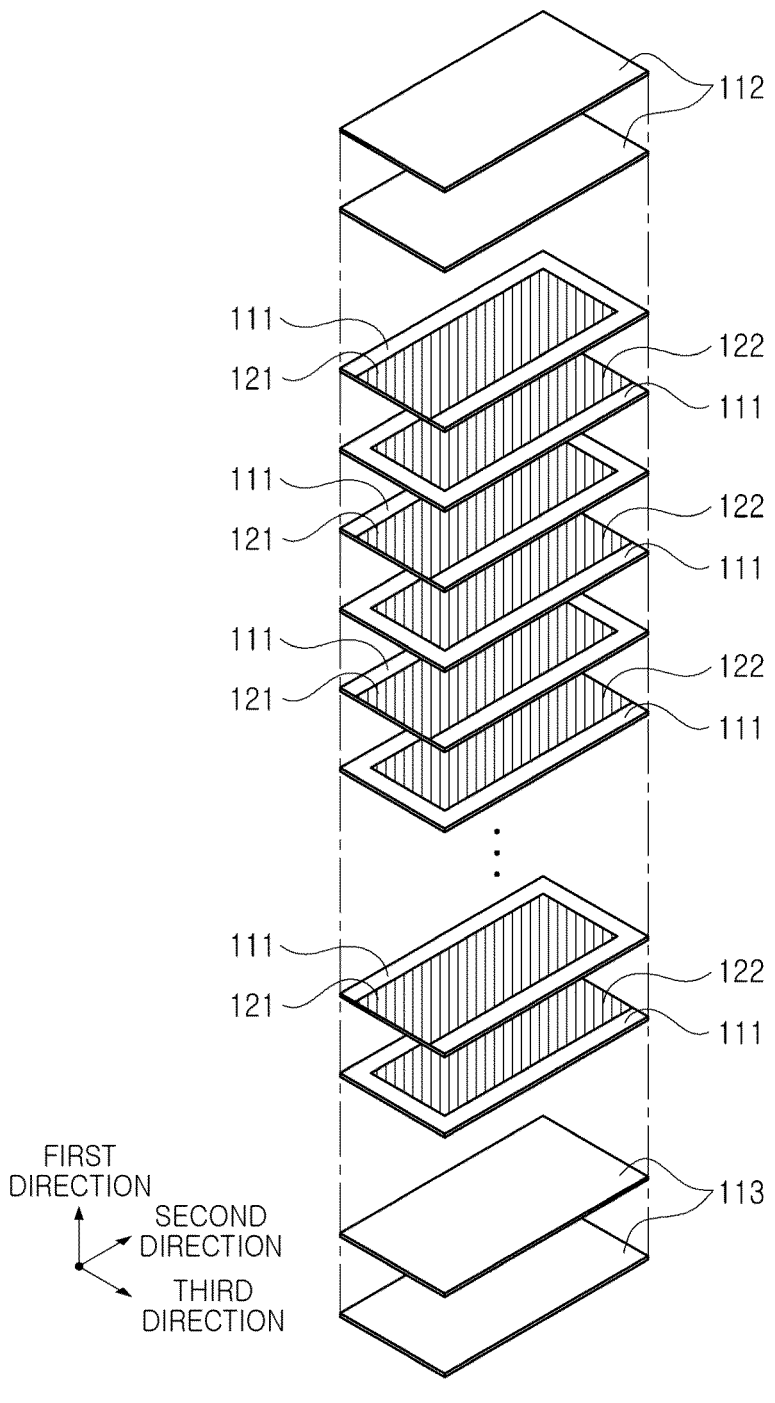
FIG. 4 is an exploded perspective diagram illustrating a body according to an example embodiment of the present disclosure.

FIG. 4 is an exploded perspective diagram illustrating a body according to an example embodiment of the present disclosure.

Figure 5:
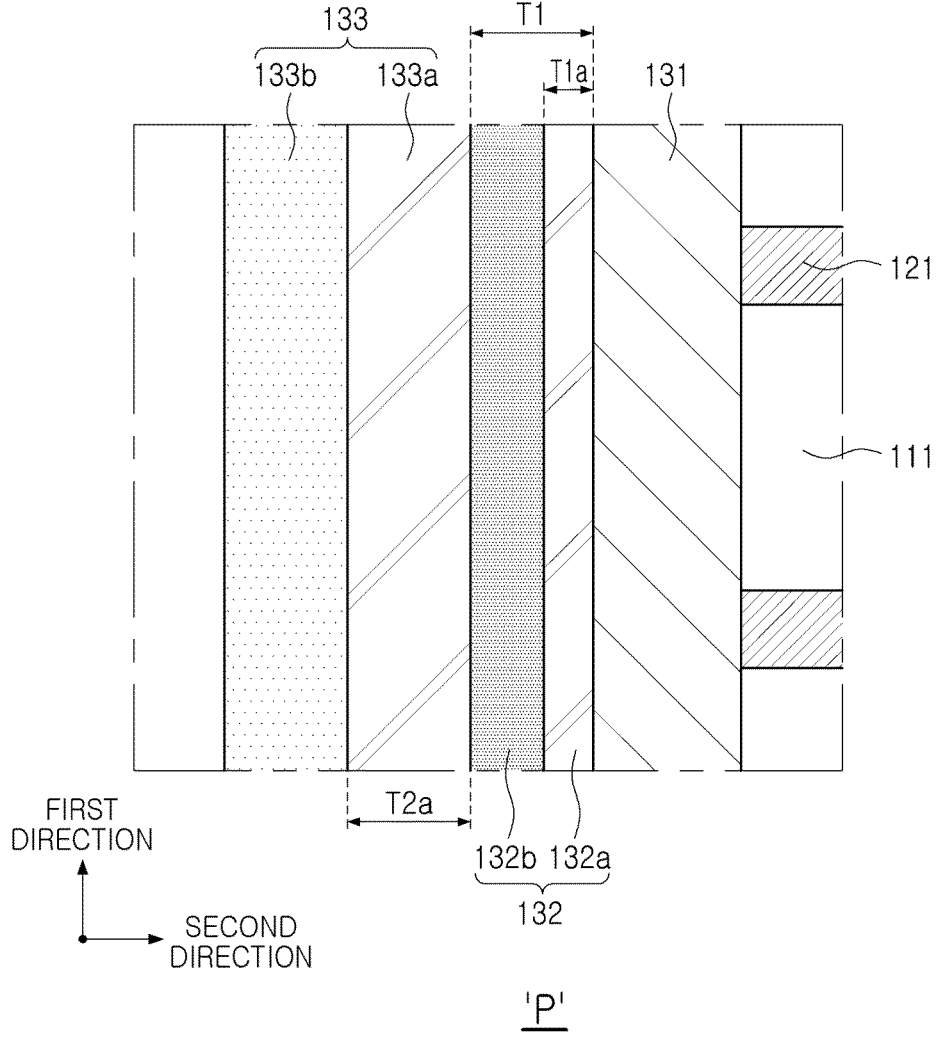
FIG. 5 is an enlarged diagram illustrating region P in FIG. 2.

FIG. 5 is an enlarged diagram illustrating region P in FIG. 2.

Hereinafter, the multilayer electronic component 100 according to an example embodiment will be described in greater detail with reference to FIGS. 1 to 5.

A multilayer electronic component 100 according to an example embodiment may include a body 110 including a dielectric layer 111 and internal electrodes 121, 122 alternately disposed with the dielectric layer; and external electrodes 130, 140 disposed on the body. The external electrode includes an electrode layer 131 connected to the internal electrode and including Cu, a first plating portion 132 disposed on the electrode layer, and a second plating portion 133 disposed on the first plating portion, and the first plating portion includes a Ni layer 132a in contact with the electrode layer and including Ni, and an intermetallic compound layer 132b disposed on the Ni layer and including an intermetallic compound including at least one of Ni and Sn.

The body 110 may include a dielectric layer 111 and internal electrodes 121 and 122 alternately disposed with the dielectric layer 111. The body 110 may have dielectric layers 111 and internal electrodes 121 and 122 laminated alternately, and the direction in which the dielectric layers 111 and the internal electrodes 121 and 122 are laminated may be defined as the first direction.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium), Zr (zirconium) is partially solid-solute.

Also, various ceramic additives, organic solvents, binders, dispersants, or the like, may be added to a raw material for forming the dielectric layer 111 in the embodiment to powder such as barium titanate ($BaTiO_3$).

The average thickness td of the dielectric layer 111 may not be limited to any particular example. For example, the average thickness td of the dielectric layer 111 may be 0.2 μm or more and 2 μm or less (i.e., in a range from 0.2 μm to 2 μm). In order to more easily obtain high capacity and miniaturization of the multilayer electronic component 100, the average thickness td of the dielectric layer 111 may be 0.35 μm or less.

The average thickness td of the dielectric layer 111 may refer to the average size of the dielectric layer 111 disposed between the first and second internal electrodes 121 and 122 in the first direction. When the body 110 includes a plurality of dielectric layers 111, the average thickness td of the dielectric layer 111 may refer to the average thickness of at least one of the plurality of dielectric layers 111.

The average thickness td of the dielectric layer 111 may be measured by scanning a cross-section of the body 110 in the length and thickness directions (L-T) using a scanning electron microscope (SEM) with a magnification of 10,000. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer 111 may be further generalized.

Referring to FIGS. 2 to 3, the body 110 may include a capacitance forming portion Ac disposed in the body 110, which may be a region in which the first and second internal electrodes 121 and 122 overlap in the first direction.

The capacitance forming portion Ac may contribute to capacitance formation of a capacitor, and may be formed by repeatedly laminating a plurality of first and second internal electrodes 121 and 122 with a dielectric layer 111 interposed therebetween.

An upper cover portion 112 may be disposed on one surface of the capacitance forming portion Ac in the first direction, and a lower cover portion 113 may be included on another surface opposing the one surface of the capacitance forming portion Ac in the first direction.

The upper cover portion 112 and the lower cover portion 113 may be formed by laminating a single dielectric layer or two or more dielectric layers on the upper and lower surfaces of the capacitance forming portion Ac in the thickness direction, respectively, and may prevent damages to the internal electrode due to physical or chemical stress.

The upper cover portion 112 and the lower cover portion 113 may not include internal electrodes and may include the same material as that of the dielectric layer 111.

That is, the upper cover portion 112 and the lower cover portion 113 may include a ceramic material, for example, a barium titanate ($BaTiO_3$) ceramic material.

The average thickness of the cover portion 112 and 113 may not be limited to any particular example. However, to easily obtain miniaturization and high capacitance of the multilayer electronic component, the average thickness tc of the cover portions 112 and 113 may be 15 μm or less. Here, the average thickness of the cover portions 112 and 113 may refer to the average thickness of each of the first cover portion 112 and the second cover portion 113.

The average thickness Tc of the cover portion 112 and 113 may refer to the size in the first direction, and may be a value obtained by averaging the size of the cover portion 112 and 113 in the first direction measured at 5 points spaced apart by an equal distance in the upper or lower portions of the capacitance forming portion Ac.

Referring to FIG. 2, margin portions 114 and 115 may be disposed on one surface and another surface opposing the one surface of the capacitance forming portion Ac in the third direction.

The margin portions 114 and 115 may include a margin portion 114 disposed on the fifth surface 5 and a margin portion 115 disposed on the sixth surface 6 of the body 110. That is, the margin portions 114 and 115 may be disposed on both side surfaces of the body 110 in the width direction.

As illustrated in FIG. 3, the margin portions 114 and 115 may refer to a region between both ends of the first and second internal electrodes 121 and 122 and the boundary surface of the body 110 in a cross-section of the body 110 taken in the width-thickness (W-T) direction.

The margin portions 114 and 115 may prevent damages to the internal electrode due to physical or chemical stress.

The margin portions 114 and 115 may be formed by forming internal electrodes by applying a conductive paste on the ceramic green sheet other than the region in which the margin portions are formed.

Also, to prevent a step difference due to the internal electrodes 121 and 122, after laminating, the internal electrodes may be cut out to be exposed to the fifth and sixth surfaces 5 and 6 of the body, a single dielectric layer or two or more dielectric layers may be laminated on both side surfaces of the capacitance forming portion Ac in the third direction (width direction), thereby forming the margin portions 114 and 115.

The width of the margin portion 114 and 115 may not be limited to any particular example. However, the average width of the margin portions 114 and 115 may be 15 μm or less to easily obtain miniaturization and high capacitance of the multilayer electronic component.

The average width of the margin portion 114 and 115 may refer to the average size of the margin portion 114 and 115 in the third direction, and may be a value obtained by averaging the size of the margin portion 114 and 115 in the third direction measured at 5 points spaced apart by an equal distance on the side of the capacitance forming portion Ac.

The internal electrodes 121 and 122 may be alternately laminated with the dielectric layer 111. In this case, the internal electrode and the dielectric layers may be alternately disposed in the first direction.

The internal electrodes 121 and 122 may include a first internal electrode 121 and a second internal electrode 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively. Specifically, one end of the first internal electrode 121 may be connected to the third surface, and one end of the second internal electrode 122 may be connected to the fourth surface. That is, in an example embodiment, the internal electrodes 121 and 122 may be in contact with the third surface 3 or the fourth surface 4.

As illustrated in FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may not be connected to the second external electrode 140 and may be connected to the first external electrode 130, and the second internal electrode 122 may not be connected to the first external electrode 130 and may be connected to the second external electrode 140. Accordingly, the first internal electrode 121 may be spaced apart from the fourth surface 4 by a predetermined distance, and the second internal electrode 122 may be spaced apart from the third surface 3 by a predetermined distance. In this case, the first and second internal electrodes 121 and 122 may be electrically separated from each other by the dielectric layer 111 disposed therebetween.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen-printing method or a gravure printing method may be used as a method of printing the conductive paste for internal electrodes, but an example embodiment thereof is not limited thereto.

The average thickness te of the internal electrodes 121 and 122 may not need to be limited to any particular example. For example, the average thickness te of the internal electrodes 121 and 122 may be 0.2 μm or more and 2 μm or less (i.e., in a range from 0.2 μm to 2 μm). In order to more easily obtain high capacity and miniaturization of the multilayer electronic component 100, the average thickness te of the internal electrodes 121 and 122 may be 0.35 μm.

The average thickness te of the internal electrodes 121 and 122 may refer to the average thickness te of the internal electrodes 121 and 122. When the body 110 includes a plurality of internal electrodes 121 and 122, the average thickness td of the internal electrodes 121 and 122 may refer to the average thickness of at least one of the plurality of internal electrodes 121 and 122.

The average thickness te of the internal electrodes 121 and 122 may be measured by scanning a cross-section of the body 110 in the length and thickness direction (L-T) using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

The external electrodes 131 and 132 may be disposed on the body 110.

The external electrodes 130 and 140 may include a first external electrode 130 disposed on the third surface 3 of the body 110 and a second external electrode 140 disposed on the fourth surface 4 of the body 110.

Hereinafter, the structures of the external electrodes 130 and 140 in the example embodiment will be described in greater detail with respect to the first external electrode 130. However, the description of the first external electrode 130 may also be applied to the second external electrode 140. Also, in the example embodiment, a structure in which the multilayer electronic component 100 has two external electrodes 131 and 132 is described, but the number or the shape of the external electrodes 131 and 132 may change depending on the shape of the internal electrodes 121 and 122 or other purposes.

Referring to FIG. 5, the external electrode 130 according to an example embodiment may include an electrode layer 131 connected to the internal electrode 121 and including Cu, a first plating portion 132 disposed on the electrode layer, and a second plating portion 133 disposed on the first plating portion 132. In this case, the first plating portion may include a Ni layer 132a in contact with the electrode layer and including Ni, and an intermetallic compound layer 132b disposed on the Ni layer and including an intermetallic compound including at least one of Ni and Sn.

The electrode layer 131 may be connected to the internal electrode 121 and may include Cu. The electrode layer 131 may secure electrical connectivity from the external electrode 130 to the internal electrode 121. The electrode layer 131 may further include at least one of a conductive metal element and an alloy other than Cu in example embodiments. Specifically, the electrode layer 131 may include at least one of Ni, Pd, Cr, and alloys thereof in addition to Cu.

The method of forming the electrode layer 131 is not limited to any particular example. The electrode layer 131 may be formed by applying a conductive paste including Cu particles and glass to the third surface 3 and fourth surface 4 of the body 110 and performing a drying and firing process, but an example embodiment thereof is not limited thereto. The electrode layer 131 may be formed by applying Cu to the third surface 3 and the fourth surface 4 of the body 110 through electrolytic plating or electroless plating. That is, the electrode layer 131 may be a fired electrode further including glass or a plating electrode not including glass, but an example embodiment thereof is not limited thereto.

Generally, the plating layer of the external electrode included in the multilayer electronic component may be formed by electroplating. When the plating layer is formed by electroplating, hydrogen may be likely to be formed, and hydrogen formed as above may penetrate into the body 110, such that electrical properties of the entire multilayer electronic component 100 may be deteriorated.

Generally, to prevent hydrogen formed during formation of the plating layer from penetrating into the body 110, a Ni—Sn alloy layer may be formed on an electrode layer including Cu.

However, when a Ni—Sn alloy layer is directly formed on a Cu electrode layer, an interfacial void defect may occur due to a difference in diffusion rates between Cu and Sn. The defects may become a main penetration path of moisture and hydrogen, and may cause a decrease in moisture resistance reliability of a multilayer electronic component.

In the example embodiment, rather than directly forming the Ni—Sn alloy layer on the electrode layer 131 including Cu, by disposing a layer between the electrode layer 131 and the Ni—Sn alloy layer, interfacial void defects due to the difference in diffusion rates between Cu and Sn may be suppressed, and moisture and hydrogen may be prevented from diffusing into the body 110, such that moisture resistance reliability of the multilayer electronic component 100 may improve.

Specifically, in the first plating portion 132 according to an example embodiment, the electrode layer 131 connected to the internal electrode 121 and including Cu and the Ni layer 132a including Ni may be disposed to be in contact with each other, and an intermetallic compound layer 132b including an intermetallic compound including at least one of Ni and Sn on the Ni layer 132a may be disposed, such that direct contact between the electrode layer 131 and the intermetallic compound layer 132b may be prevented, and void defects due to a difference in diffusion rates between Cu and Sn may be prevented. Accordingly, penetration of hydrogen and moisture into the body 110 may be effectively suppressed, and void defects between the electrode layer 131 and the first plating portion 132 may be prevented. Accordingly, moisture resistance reliability of the multilayer electronic component 100 may be significantly improved.

The method of forming the first plating portion 132 is not limited to any particular example. For example, the first plating portion 132 may be formed by plating the Ni layer 132a on the electrode layer 131 using electroplating or electroless plating, and plating intermetallic compound layer 132b using alloy plating. In this case, hydrogen which may be generated when the Ni layer 132a is formed by electroplating may be removed by performing a heat treatment after forming the intermetallic compound layer 132b.

The type of intermetallic compound including at least one of Ni and Sn included in intermetallic compound layer 132b is not limited to any particular example. For example, the intermetallic compound may include at least one of $Ni_3Sn$, $Ni_3Sn_2$ and $Ni_3Sn_4$.

The average thickness T1 of the first plating portion 132 is not limited to any particular example. However, the average thickness T1 of the first plating portion 132 may be preferably 0.3 μm or more to sufficiently cover the surface of the electrode layer 131. An upper limit of the average thickness T1 of the first plating portion 132 is not limited to any particular example, and may be preferably 5 μm or less for miniaturization of the multilayer electronic component 100. In other words, the average thickness T1 of the first plating portion 132 may be in a range from 0.3 μm to 5 μm.

The second plating portion 133 may be disposed on the first plating portion 132. The second plating portion 133 may further improve sealing properties or mounting properties of the external electrode 130.

In one example embodiment, the second plating portion 133 may include an Ni layer 133a in contact with the first plating portion 132 and including Ni, and an Sn layer 133b disposed on the Ni layer 133a of the second plating portion 133 and including Sn. Accordingly, sealing properties of the multilayer electronic component 100 may be further improved, and mounting properties may also be improved.

A method of forming the second plating portion 133 is not limited to any particular example, and may be formed using various plating methods such as electroless plating and electroplating.

An average thickness T1a of the Ni layer 132a of the first plating portion 132 may be greater than an average thickness T2a of the Ni layer 133a of the second plating portion 133. Accordingly, the electrostatic capacity per unit volume of the multilayer electronic component 100 may be improved by reducing the proportion of the first plating portion 132 in the external electrode 130.

A method of measuring the average thickness T1 of the first plating portion 132, the average thickness T1a of the Ni layer 132a of the first plating portion 132, and the average thickness T2a of the Ni layer 133a of the second plating portion 133 are not limited to any particular example. For example, the value may be obtained by exposing cross-sections in the first and second directions by FIB milling up to the central portion of the multilayer electronic component 100 in third direction, dividing the region into 5 portions in the first direction from an uppermost end to a lowermost end of the internal electrodes 121 and 122, and averaging the size in the second direction measured using energy dispersive X-ray spectrometry (SEM-EDX) Ion mode at random points in each region. In this case, recognition of the layers may be carried out by identifying the composition through SEM-EDX analysis. In particular, the presence or absence of an intermetallic compound including at least one of Ni and Sn may be determined through SEM-EDX analysis and X-Ray diffraction (XRD) analysis.

Figure 6:
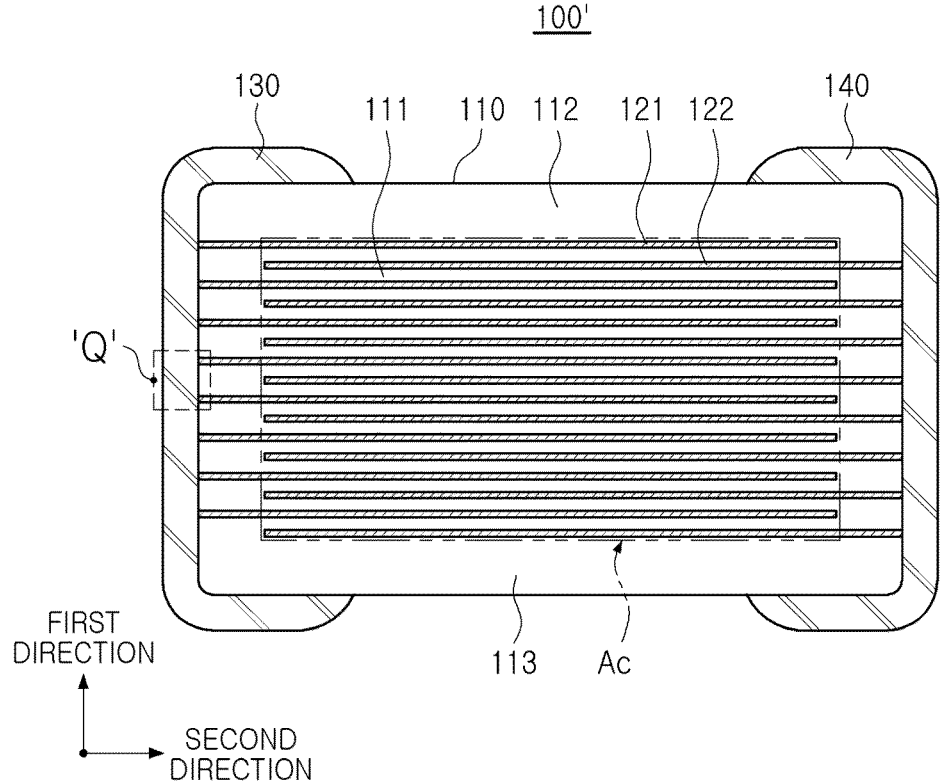
FIG. 6 is a cross-sectional diagram illustrating a multilayer electronic component according to an example embodiment of the present disclosure, corresponding to the cross-sectional diagram taken along line I-I' in FIG. 1.

FIG. 6 is a cross-sectional diagram illustrating a multilayer electronic component according to an example embodiment of the present disclosure, corresponding to the cross-sectional diagram taken along line I-I' in FIG. 1.

Figure 7:
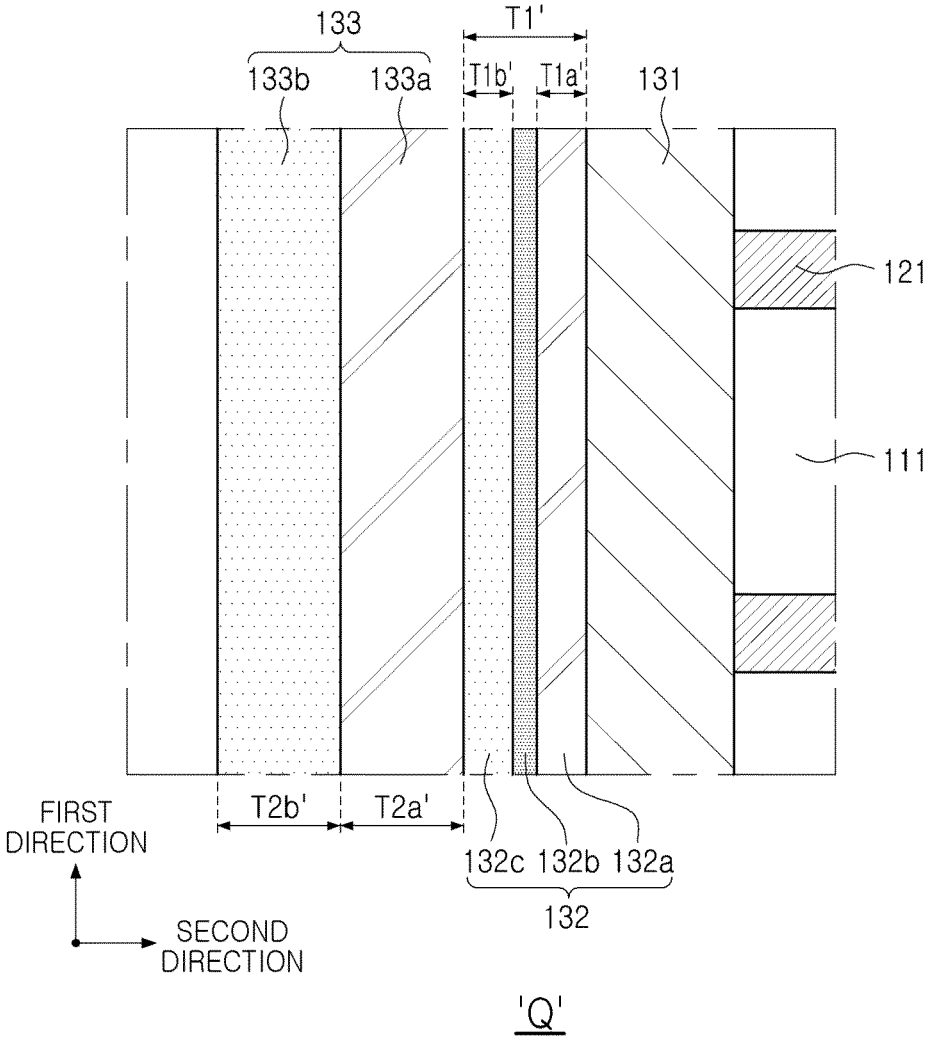
FIG. 7 is an enlarged diagram illustrating region Q in FIG. 6.

FIG. 7 is an enlarged diagram illustrating region Q in FIG. 6.

Hereinafter, the multilayer electronic component 100' according to another example embodiment and various example embodiments will be described in detail with reference to FIGS. 6 and 7. The descriptions overlapping the multilayer electronic component 100 according to an example embodiment will not be provided.

Referring to FIGS. 6 and 7, the multilayer electronic component 100' according to another example embodiment may have substantially the same configuration as that of the multilayer electronic component 100 according to an example embodiment, other than the structure of the first plating portion 132.

Specifically, referring to FIG. 7, the multilayer electronic component 100' according to another example embodiment may include a body 110 including a dielectric layer 111 and internal electrodes 121 and 122 alternately disposed with the dielectric layer; and external electrodes 130 and 140 disposed on the body, wherein the external electrode includes an electrode layer 131 connected to the internal electrode and including Cu, a first plating portion disposed on the electrode layer, and a second plating portion 132 disposed on the first plating portion, and the first plating portion includes an Ni layer 132a in contact with the electrode layer and including Ni, an intermetallic compound layer 132b disposed on the Ni layer and including an intermetallic compound including at least one of Ni and Sn, and an Sn layer 132c disposed on the intermetallic compound layer and including Sn.

In this case, in the first plating portion 132, the Ni layer 132a including Ni and the Sn layer 132c including Sn may be formed in order on the electrode layer 131, and the intermetallic compound layer 132b including an intermetallic compound including Ni and Sn may be formed on the interfacial surface of Ni layer 132a and Sn layer 132c through a heat treatment. Accordingly, hydrogen generated when the Ni layer 132a and Sn layer 132c are formed by electroplating in the process of forming the intermetallic compound layer 132b may be removed, thereby improving moisture resistance reliability of the multilayer electronic component 100'.

The average thickness T1' of the first plating portion 132 is not limited to any particular example. However, the average thickness T1' of the first plating portion 132 may be preferably 0.5 μm or more to sufficiently cover the surface of the electrode layer 131. An upper limit of the average thickness T1' of the first plating portion 132 is not limited to any particular example, and may be preferably 5 μm or less for miniaturization of the multilayer electronic component 100. In other words, the average thickness T1' of the first plating portion 132 may be in a range from 0.5 μm to 5 μm.

The average thickness T1a' of the Ni layer 132a of the first plating portion 132 may be smaller than the average thickness T2a' of the Ni layer 133a of the second plating portion 133. Accordingly, capacitance per unit volume of the multilayer electronic component 100 may be improved by reducing the proportion of the first plating portion 132 in the external electrode 130.

Similarly, the average thickness T1b' of the Sn layer 132c of the first plating portion 132 may be smaller than the average thickness T2b' of the Sn layer 133b of the second plating portion 133.

A method of measuring the average thickness T1' of the first plating portion 132, the average thickness T1a' of the Ni layer 132a of the first plating portion 132, the average thickness T1b' of the Sn layer 132c of the first plating portion 132, the average thickness T2a' of Ni layer 133a of the second plating portion 133, and the average thickness T2b' of Sn layer 133b of the second plating portion 133 is not limited to any particular example. For example, the average thicknesses may be obtained by exposing cross-sections in the first and second directions by FIB milling up to the central portion of the multilayer electronic component 100 in third direction, dividing the region into 5 portions in the first direction from an uppermost end to a lowermost end of the internal electrodes 121 and 122, and averaging the sizes in the second direction measured using energy dispersive X-ray spectrometry (SEM-EDX) Ion mode at random points in each region. In this case, recognition of the layers may be carried out by identifying the composition through SEM-EDX analysis. In particular, the presence or absence of an intermetallic compound including at least one of Ni and Sn may be determined through SEM-EDX analysis and X-Ray diffraction (XRD) analysis.

According to the aforementioned embodiments, by blocking hydrogen or moisture generated when a plating layer is formed on the external electrode from penetrating into the body, moisture resistance reliability of the multilayer electronic component may improve.

Also, when hydrogen, which may be generated when a plating layer is formed on the external electrode, penetrates into the body, by removing hydrogen through a heat treatment, moisture resistance reliability of the multilayer electronic component may be improved.

While the embodiments have been illustrated and described above, it will be configured as apparent to those skilled in the art that modifications and variations could be made without departing from the scope of the present disclosure as defined by the appended claims.

What is claimed is:
1. A multilayer electronic component, comprising:
a body including a dielectric layer and an internal electrode alternately disposed with the dielectric layer; and
an external electrode disposed on the body,
wherein the external electrode includes an electrode layer connected to the internal electrode and including Cu, a first plating portion disposed on the electrode layer, and a second plating portion disposed on the first plating portion,
wherein the first plating portion includes a first Ni layer in direct contact with the electrode layer, and an intermetallic compound layer disposed on the first Ni layer and including an intermetallic compound including at least one of Ni or Sn, and wherein the second plating portion includes a second Ni layer in contact with the first plating portion.

2. The multilayer electronic component of claim 1, wherein the intermetallic compound includes at least one of $Ni_3Sn$, $Ni_3Sn_2$ and $Ni_3Sn_4$.

3. The multilayer electronic component of claim 1, wherein an average thickness of the first plating portion is in a range from 0.3 μm to 5 μm.

4. The multilayer electronic component of claim 1, wherein the second plating portion further includes a second Sn layer disposed on the second Ni layer.

5. The multilayer electronic component of claim 4, wherein an average thickness of the first Ni layer is smaller than an average thickness of the second Ni layer.

6. The multilayer electronic component of claim 1, wherein the electrode layer further includes glass.

7. The multilayer electronic component of claim 1, wherein the electrode layer does not include glass.

8. A multilayer electronic component, comprising:
   a body including a dielectric layer and an internal electrode alternately disposed with the dielectric layer; and
   an external electrode disposed on the body,
   wherein the external electrode includes an electrode layer connected to the internal electrode and including Cu, a first plating portion disposed on the electrode layer, and a second plating portion disposed on the first plating portion, wherein the first plating portion includes a first Ni layer in direct contact with the electrode layer, an intermetallic compound layer disposed on the Ni layer and including an intermetallic compound including at least one of Ni or Sn, and a first Sn layer disposed on the intermetallic compound layer, and wherein the second plating portion includes a second Ni layer in contact with the first plating portion.

9. The multilayer electronic component of claim 8, wherein the intermetallic compound includes at least one of $Ni_3Sn$, $Ni_3Sn_2$ and $Ni_3Sn_4$.

10. The multilayer electronic component of claim 8, wherein an average thickness of the first plating portion is in a range from 0.5 μm to 5 μm.

11. The multilayer electronic component of claim 8, wherein the second plating portion further includes a second Sn layer disposed on the Ni layer of the second plating portion.

12. The multilayer electronic component of claim 11, wherein an average thickness of the first Ni layer is smaller than an average thickness of the second Ni layer, and an average thickness of the first Sn layer is smaller than an average thickness of the second Sn layer.

13. The multilayer electronic component of claim 8, wherein the electrode layer further includes glass.

14. The multilayer electronic component of claim 8, wherein the electrode layer does not include glass.

* * * * *